Aug. 30, 1966     E. WOOD     3,269,654
METHOD OF SERVICING EXPANSION TANKS ON HOT WATER HEATING SYSTEMS
Filed Sept. 8, 1964
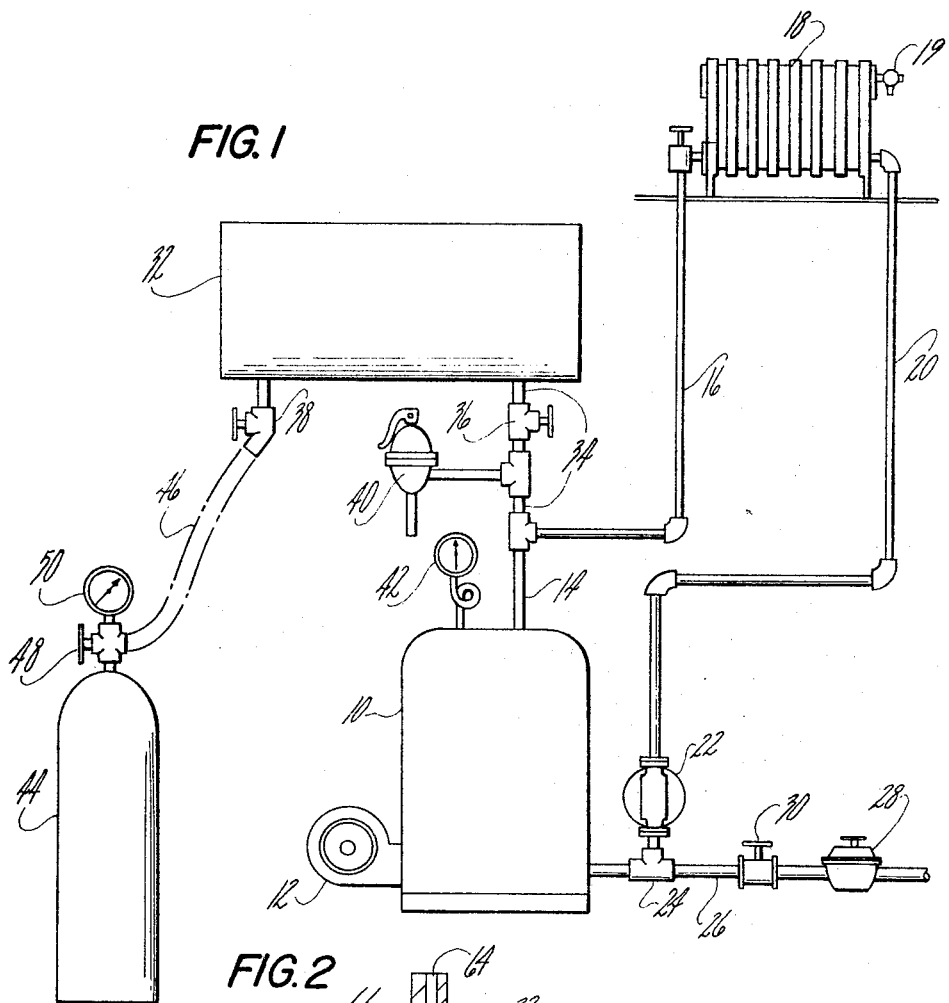
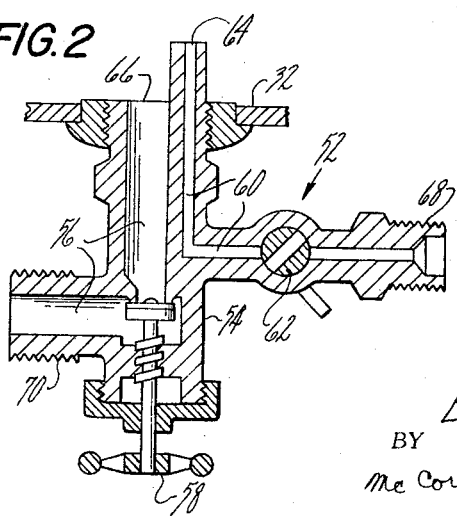
INVENTOR.
EDWARD WOOD
BY
McCormick, Paulding & Huber
ATTORNEYS United States Patent Office
3,269,654
Patented August 30, 1966

3,269,654
METHOD OF SERVICING EXPANSION TANKS ON HOT WATER HEATING SYSTEMS
Edward Wood, 418 Maple St., Wethersfield, Conn.
Filed Sept. 8, 1964, Ser. No. 394,693
6 Claims. (Cl. 237—81)

This invention relates to home hot water heating systems and more particularly to a method for purging water from an expansion tank in a hot water heating system and air and other gases from the remainder of the system.

An expansion or compression tank is customarily employed as a boiler accessory on a hot water heating system. When the heating system is first filled with water, this tank partially fills trapping air in its upper section, forming an air cushion therein. This air cushion serves to absorb the excess pressure that develops in the system due to hot-water expansion and the shock of water hammer, thereby eliminating the necessity for hot water being wasted through the relief valve with a resulting saving in fuel. This cushion of compressed air also serves to provide a relatively uniform pressure in the system, irrespective of variations in water temperature.

The solubility of air in water varies with water temperature, and, as a consequence of this phenomenon, the water in contact with the air in the expansion tank tends to absorb small quantities of this air and to liberate it in other parts of the system when the temperature of this air-charged water is increased. This gradual cyclic process reduces the volume of air in the expansion tank and, eventually, the air cushion is entirely lost—the air having been replaced by water. The expansion tank is then said to be "water-logged" and it must be purged or drained to restore its effectiveness. The air which has been liberated in other parts of the system tends to collect at the high points displacing the heating liquid; therefore, it too must be removed to restore the system to full efficiency.

In the absence of the cushioning effect of the expansion tank the pressure in the system will fluctuate, increasing sharply during the heating cycle and causing water to escape from the system through the relief valve. When the heating cycle ceases, the water in the system cools and contracts thereby reducing the pressure in the system and allowing new water to enter the system through an automatic refill valve, usually provided for the purpose. The new water contains air in solution, which is liberated as the water is heated and which also tends to accumulate in the high points of the system. The constant addition of new water will often cause the boiler to become fouled or "limed up," which results in a further loss in heating efficiency. This condition is particularly troublesome in hard water localities.

The importance of maintaining the efficiency of the expansion tank throughout the heating season is apparent from the foregoing discussion. The customary procedure for purging an expansion tank is to close a valve to isolate the tank from the remainder of the system and to then open a draining valve on the tank to permit the water in the tank to flow from the tank. After the tank is emptied of water, air at atmospheric pressure flows into the tank through the drain valve. This valve is then closed and the valve between the expansion tank and the remainder of the system is opened. Water at system pressure thereupon flows into the tank and compresses the air in the tank until the pressure of the air trapped in the upper portion of the tank equals the pressure exerted by the water in the system. Since hot water heating systems of this type invariably operate above atmospheric pressure, it is apparent that some of the air volume in the tank is almost immediately reduced by this compression process. For this reason, often ½ or more of the volume of the tank is reoccupied by water immediately following the purging process. This reduction in available air cushion volume reduces the potential duration of the expansion tank's efficient operation.

Accordingly, it is the general aim of this invention to provide a method for purging an expansion tank which will prolong the interval between necessary purging operations to insure the uninterrupted efficiency of the heating system throughout the heating season.

It is a further object of the invention to provide a purging process which will reduce the volume of air normally present in the system, thereby retarding deterioration by oxidation and corrosion and prolonging the life life of the system.

A further object of the invention is to provide a purging process which is rapidly, efficiently, and inexpensively performed, and which attains the aforestated objects without requiring physical changes in the existing heating system.

Other objects and advantages of the invention will be apparent from the following description.

The objects of this invention are attained through the novel employment of the physical characteristics of the gas used in the purging process hereinafter disclosed.

The following description and accompanying drawing relate to a preferred manner of practicing the invention on one particular form of hot water heating system, but it will be understood that various changes may be made from the specific method disclosed and that the method may be applied to other forms of hot water heating systems. The drawing and description are not to be construed as defining or limiting the scope of the invention, the claims forming a part of this specification being relied upon for that purpose.

Of the drawing:

FIG. 1 is a diagrammatic elevation of a home hot water heating system embodying elements usable in practicing the method of the invention.

FIG. 2 is a sectional side view of a valve usable in practicing a modification of the method of the invention.

Referring to FIG. 1, there is shown a hot water generator or boiler 10 of conventional design that may be fired in any desired manner—oil burner firing means being shown by way of example at 12. A supply riser 14 from the boiler 10 is connected with a pipe line or conduit 16 by which hot boiler water is supplied to one or more radiating units in the heating system, one such radiator 18 being shown in the present instance. A conventional bleeding valve 19 is provided on the radiating unit 18. The water is returned from the radiator 18 to the lower part of the boiler 10 by a return pipe or conduit 20. The return line 20 includes a motor driven circulating pump 22, shown for convenience at this point in the system. The pump 22 is normally thermostatically controlled to respond to demands for heat by circulating the hot boiler water through the system. Additional water, commonly referred to as new water, may be introduced into the system through a T-connector 24 from a water supply pipe of conduit 26. A supply valve 28, usually an automatic pressure responsive valve, allows new water to enter the system, from time to time, to meet system demands. A manually operated shut-off valve 30, interposed between the boiler 10 and the supply valve 28 in the supply pipe 26, permits isolation of the system from the source of water supply.

An expansion tank 32 normally containing water in its lower portion and air trapped in its upper portion is interconnected with the supply riser 14 by a pipeline or conduit 34. Means for isolating the expansion tank from the remainder of the heating system is provided by the shut-off valve 36 in the pipeline 34. A draining valve 38 for draining the expansion tank, and for purging it in the manner to be hereinafter disclosed, is customarily located at the lowest point on the expansion tank.

Connected to the upper portion of the water space in the boiler is a conventional pressure relief valve 40 for relieving the water pressure to a suitable drain (not shown) when the water pressure in the system reaches or exceeds a predetermined value, for example 30 pounds gauge pressure. A pressure indicating device 42 located on the boiler, responds to the pressure developed in the system and provides a visual indication of the system pressure.

The maximum benefit will be derived from performing the process early in the heating season, after the heating system has attained normal operating temperature, as will be hereinafter explained. In its broadest aspects, the process of this invention comprises draining the water from the expansion tank and refilling it with a gas at a pressure close to that of the system pressure before the tank is returned to the system, the gas preferably being nitrogen or some other gas less corrosive and less soluble in water than air. Various different detailed steps may be followed in carrying out this broad method, and a preferred form of procedure is described in detail below.

The first step in the detailed process is to connect a source of gas under pressure, here shown as a bottle 44 of pressurized gas, to the draining valve 38 on the expansion tank 32. A flexible hose 46, shown in dotted lines, is employed for this purpose. Shut-off valve 30 is then closed to isolate the system from the source of water supply, thereby preventing new water from entering the system during the purging operation. A gas regulator valve 48 on the gas bottle 44 is now adjusted until an indicator 50 on the gas bottle 44 reads slightly higher than the pressure indicating device 42 on the heating system. It has been found that setting the pressure regulator on the gas bottle at a pressure about five pounds above the pressure in the system provides satisfactory pressure for this purging operation. Draining valve 38 on expansion tank 32 is now opened. After the pressure in the system has been increased by the introduction of the gas, the bleeding valve 19 on the radiator 18 is opened to allow air and other gases trapped in the upper portion of the radiator to escape from the system. After the air and other gases have been expelled from the radiator and water commences to flow freely from the valve 19, the valve 19 is closed. This procedure is repeated on each radiator in the system starting with the units furthest removed from the expansion tank and working back along the system toward the tank. When this operation is completed, the circulating portion of the system is free of air and other gas contamination.

The shut-off valve 36 is now closed to isolate the expansion tank from the remainder of the heating system. The draining valve 38 and the gas regulating valve 48 are then also closed and the flexible hose 46 is thereafter disconnected from the regulating valve 48. The draining valve 38 is now opened, permitting water to flow from the expansion tank 32 through the flexible hose 46 to a suitable receptacle or a sewer.

If the gas pocket in the top of the expansion tank is of considerable size, the pressure and quantity of the gas in the pocket may be sufficient to fairly rapidly force all of the water from the tank through the draining valve. Often, however, this gas pocket is initially quite small with the result that after the draining valve is opened the water will flow rapidly out of the tank for only a brief time and then diminish to a very small rate of flow due to loss of pressure in the gas pocket. At this slow rate of flow, it usually takes a very long time for the remaining water to escape from the tank, and it is therefore desirable to introduce more pressurized gas into the gas pocket to speed up the draining process. This is conveniently done in accordance with the present invention by closing the draining valve 38 when the flow of water therefrom falls to an undesirable low value. The flexible hose 46 is then once again connected to the regulator valve 48 and the valve 48 is opened. The draining valve 38 is then opened permitting the introduction of additional gas under pressure into the expansion tank 32. When the pressure in the expansion tank is slightly greater than that ordinarily attained by the system, the draining valve 38 is again closed and the flexible hose 46 again disconnected from the regulator valve 48. The draining valve 38 is then once again opened and the water allowed to flow from the tank 32. If all of the remaining water is not now rapidly expelled from the tank, the above steps for adding additional pressurized gas to the tank may be followed for as many times as may be required.

The purging cycle is completed, when water ceases to flow from the expansion tank. When this occurs, the valve 38 is immediately closed and the flexible hose 46 promptly connected to the regulator valve 48. Throughout the purging cycle described above, the regulator valve 48 was set to provide a pressure slightly greater than the pressure normally attained by the system. It is now readjusted to provide a pressure approximately equal to the normal operating pressure of the system. After this is done, the draining valve 38 is opened to permit gas from the bottle 44 to flow into the tank and fill the latter with gas at approximately the system pressure. The draining valve 38 is now closed.

The shut-off valve 36 is now opened to reconnect the expansion tank to the remainder of the system. The valve 30 is next opened to reconnect the system with the source of water supply. The regulator valve 48 may now be closed after which the flexible hose 46 is disconnected from the draining valve 38 to complete the process.

Since the expansion tank is at a pressure substantially equal to system operating pressure, whereas the remainder of the system is at a pressure slightly greater than that normally attained by the system, a small quantity of water will flow into the tank 32 from the system when the valve 36 is opened. Thus, a water seal forms over the draining valve, which is customarily located on the lowest portion of the tank, preventing the escape of gas from the tank through the draining valve.

Under conditions of constant temperature, the volume of a gas varies inversely with pressure. Suppose an expansion tank in a system operating at a pressure of 30 pounds per square inch is purged in the usual manner by isolating the tank from the heating system and allowing the water to drain from the tank and to be replaced by air at atmospheric pressure. When the expansion tank is reconnected to the system, the pressure upon the air in the tank is approximately doubled, thereby immediately compressing it to half of its original volume. However, if the expansion tank is filled with gas at a pressure equal to the normal operating pressure of the system, no loss of gas volume occurs when the tank is reconnected to the operating system. Thus, for example, on a system operating at a 15 pound gauge pressure it is theoretically possible to double the effective volume of the gas cushion in the expansion tank by employing a gas under pressure in place of air at atmospheric pressure in the purging process. The result is to more than double the potential duration of effectiveness of the purging operation. This is due to the fact that by starting with the expansion tank almost completely filled with gas, expansion of the water causes less of an increase in the system pressure than it would if the expansion tank were only half filled with gas, and to the fact that the rate of gas absorption by the water increases as the pressure increases.

In the presently preferred form of the process, nitrogen is employed as the gas for pressurizing the expansion tank because it possesses desirable physical characteristics and its use is presently economically feasible. The solubility of nitrogen in water decreases as the water temperature increases. It is only about ⅓ as soluble in water at 180° Fahrenheit as it is in water at 70° Fahrenheit. It is also only about ½ as soluble as oxygen is in water at 180° and about 1/55 as soluble as carbon dioxide in water at the same temperature. Therefore, it becomes apparent that the maximum advantage from purging a heating system with nitrogen is realized when the process is performed while the heating system is at normal operating temperature. Similar results are obtained where other gases having similar physical characteristics are employed.

As is the case with air, the nitrogen in the expansion tank will be absorbed by the water and will be liberated by the water as it is heated. However, because of the lower solubility of nitrogen in water as compared to the oxygen and carbon dioxide contained in air, this cyclic process will take place at a considerably slower rate in an operating heating system having a nitrogen cushion in the expansion tank than it would in a similar operating system having an air cushion therein. The result is a reduction in the rate of gas contamination in the high points of the system, thereby prolonging the period between radiator bleeding operations and increasing the efficiency of the radiator units during this period. A correlative reduction in the dissipation of the gas in the expansion tank also results, thereby prolonging the interval between necessary purging operations performed on the expansion tank.

Furthermore, an important benefit of the method of this invention as described above is that it reduces the volume of oxygen and other active gases in the system and thereby serves to retard deterioration of the system components by oxidation and corrosion so as to prolong the life of the heating system.

Purging an expansion tank in the customary manner is usually a time consuming operation, because the air entering the tank to replace the water draining from it must enter through the same opening through which the water is draining. There is a tendency for a partial vacuum to be created in the upper portion of the tank as the water drains through the draining valve. Air must enter periodically through the draining valve to replace the water in order to break this vacuum so that the draining may continue. The result is usually a slow intermittent flow of water from the expansion tank which prolongs the purging operation. The process herein described overcomes this difficulty by introducing the gas under pressure. Consequently, the water will drain from the expansion tank at a reasonably rapid rate until the pressure in the tank reaches atmospheric pressure, at which time the water will begin to drain more slowly and then intermittently, as the pressure in the upper portion of the tank intermittently drops below atmospheric pressure. When this condition occurs, more gas will be introduced and the draining process will again continue at a more rapid rate. The overall result will be an appreciable reduction in the time usually necessary to perform the purging operation.

In addition to practicing the invention process with the conventional type of valve usually found on home heating system expansion tanks, it is possible to practice a modification of the process by employing a specialized type of valve designed to permit the simultaneous flow of gas and water.

Referring to FIG. 2 of the drawing, a valve 52 is shown which is a typical valve of the type usable in practicing a modification of the method of the invention. In this modification of the process, the valve 52 replaces the valve 38 in the expansion tank 32. The valve 52 comprises a body 54 having therein a first port opening 56 communicating with the lower interior portion of the expansion tank 32 for draining water from the tank. A first port valve 58 is provided for opening and closing the first port 56 to control the flow of water from the tank. The valve body 54 also has a second port opening 60 communicating with the lower interior portion of the expansion tank 32, for introducing gas under pressure into the expansion tank. A second port valve 62 is provided to control the flow of gas to and from the tank. The purpose of the valve 52 is to permit the simultaneous ingress of gas under pressure and egress of water relative to the expansion tank 32. The orifice 64 of the port 60 is located somewhat above the orifice 66 for the port 56 to overcome the problem of turbulence which would be caused by the simultaneous flow of water and gas which would tend to impeded water drainage. A threaded end portion 68 is provided on the valve body 54 for connecting a source of gas under pressure to the port opening 60. The end portion of the port opening 56 is also provided with a thread 70 for connecting a drain hose to facilitate draining to a sewer or other receptacle.

In using valve 52 to practice a modification of the process, the flexible hose 46 would be connected to the threaded portion 68. The valve 62 is opened to admit gas under pressure from the source 44 into the expansion tank 32 through the port opening 60. Port valve 58 is opened to allow water to drain from the tank 32 through the port opening 56. When water ceases to flow from the valve 52, the port valve 58 is closed. When the pressure in the expansion tank 32 is substantially equal to the normal operating pressure of the heating system, the valve 62 is closed. Thereafter, the source of gas under pressure may be disconnected from the valve 52.

The use of this valve provides an effective means for preventing air from entering the tank during the draining cycle. It also provides a means for maintaining a relatively constant pressure in the expansion tank during the draining process which will often substantially reduce the time necessary to perform the process.

The invention claimed is:

1. A method for servicing an expansion tank connected with a hot water heating system and having a draining valve communicating with the lower portion thereof which method comprises the steps of draining the water from said tank through said draining valve, and filling said tank through said draining valve with a gas under a pressure substantially equal to the pressure in said heating system.

2. A process for servicing an expansion tank on a hot water heating system, said process comprising, isolating said expansion tank from said system, opening said tank near the bottom thereof to allow the water therein to drain therefrom, until said tank is empty of water, adding gas under pressure to said tank during said draining step and when the pressure falls below atmospheric pressure, thereafter introducing gas into said tank to fill said tank with a gas at a pressure equal to the pressure in said heating system, and then returning said expansion tank to said system while filled with said pressurized gas.

3. A process for servicing an expansion tank on a hot water heating system having a hot water generator, an expansion tank having a normally closed draining valve, conduit means for circulating hot water through said heating system, and a normally open isolating valve for isolating said expansion tank from said heating system, said process comprising the steps of starting said heating system and allowing said system to attain normal operating temperature and pressure, closing said isolating valve, connecting a source of gas under pressure to said draining valve, opening said draining valve to introduce gas under pressure from said source into said expansion tank to increase the pressure therein, closing said draining valve, disconnecting said source of gas from said draining valve, opening said draining valve to permit the water from said expansion tank to flow therethrough, closing said draining valve, reconnecting said source of gas to said draining valve opening said draining valve, introducing said gas into said expansion tank at a pressure substantially equal to the pressure in said heating system, closing said draining valve when the pressure in said expansion tank is substantially equal to the pressure in said heating system, opening said isolating valve to return said expansion tank to said heating system, and disconnecting said source of gas from said draining valve.

4. A process for servicing an expansion tank and for purging air and other gases from a radiator on a hot water heating system having a hot water generator, a radiator having a bleeding valve thereon, an expansion tank having a draining valve, a water supply source, conduit means for circulating heated water through said heating system, a first isolating valve for isolating said heating system from said water supply source and a second isolating valve for isolating said expansion tank from said heating system, said process comprising the steps of closing said first isolating valve, connecting a source of gas under pressure to said draining valve, opening said draining valve, introducing said gas into said expansion tank for increasing the pressure within said heating system, opening said bleeding valve on said radiator to permit the air and other gases contained in said radiator to escape therefrom, closing said bleeding valve on said radiator, closing said second isolating valve, closing said draining valve, disconnecting said source of gas from said draining valve, opening said draining valve to permit the water in said tank to drain therefrom, closing said draining valve when water ceases to flow from said draining valve, reconnecting said source of gas under pressure to said draining valve, opening said draining valve, introducing said gas into said expansion tank through said draining valve, closing said draining valve when the pressure in said expansion tank is substantially equal to the pressure in said heating system, opening said first isolating valve to return said water supply source to said heating system, opening said second isolating valve to return said expansion tank to said heating system, and disconnecting said source of gas from said draining valve.

5. A process for servicing an expansion tank and for purging air and other gases from a radiator on a hot water heating system having a hot water generator, a radiator having a bleeding valve thereon, an expansion tank having a draining valve, a water supply source, conduit means for circulating heated water through said heating system, a first isolating valve for isolating said heating system from said water supply source and a second isolating valve for isolating said expansion tank from said heating system, said process comprising the steps of closing said first isolating valve, connecting a source of gas under pressure to said draining valve, opening said draining valve for introducing said gas into said expansion tank to increase the pressure within said heating system, opening said bleeding valve on said radiator to permit air and other gases to escape from said radiator, closing said bleeding valve, closing said second isolating valve, closing said draining valve, disconnecting said source of gas under pressure from said draining valve, opening said draining valve to permit water to drain from said expansion tank, closing said draining valve when the flow of water from said draining valve decreases due to reduction in pressure in said expansion tank, reconnecting said source of gas to said draining valve, opening said draining valve for introducing said gas into said expansion tank, closing said draining valve, disconnecting said source of gas under pressure from said draining valve, opening said draining valve to permit water to drain from said expansion tank, closing said draining valve when water ceases to flow from said draining valve, reconnecting said source of gas to said draining valve, opening said draining valve for introducing said gas into said expansion tank, closing said draining valve when the pressure in said expansion tank is substantially equal to the normal operating pressure of said heating system, opening said second isolating valve to return said expansion tank to said heating system, and opening said first isolating valve to return said water supply source to said heating system, and removing said source of gas from said draining valve.

6. A process for servicing an expansion tank on a hot water heating system having a hot water generator, an expansion tank, conduit means for circulating hot water through said heating system, and a normally open isolating valve for isolating said expansion tank from said heating system, said process comprising the steps of closing said isolating valve, providing said expansion tank with a draining valve having first and second ports communicating with the lower interior portion of said tank and having first and second valve elements for opening and closing said first and second ports respectively, connecting a source of gas under pressure to said second port, opening said second valve element, introducing said gas from said source into said expansion tank to increase the pressure therein, opening said first valve element to permit the water from said expansion tank to flow therethrough, closing said first valve element when water ceases to flow therefrom, closing said second valve element when the pressure in said expansion tank is substantially equal to the normal operating pressure in said heating system, disconnecting said source of gas from said second port, opening said isolating valve to return said expansion tank to said heating system.

References Cited by the Examiner
UNITED STATES PATENTS

| | | | |
|---|---|---|---|
| 2,888,204 | 5/1959 | Williams | 237—59 |
| 2,960,272 | 11/1960 | Saunders | 237—8 |
| 3,128,947 | 4/1964 | Saunders | 237—8 |
| 3,134,543 | 5/1964 | Carlson et al. | 237—63 |

EDWARD J. MICHAEL, *Primary Examiner.*